May 26, 1964 W. J. KRUPICK ET AL 3,134,265
LAMINATED GIMBAL FOR GYRO AND METHOD OF MAKING
Filed Dec. 6, 1960 5 Sheets-Sheet 4

WALTER J. KRUPICK
JAY HOFFMAN
INVENTORS

BY Andrew L. Bain

ATTORNEYS

United States Patent Office 3,134,265
Patented May 26, 1964

3,134,265
LAMINATED GIMBAL FOR GYRO AND METHOD OF MAKING
Walter J. Krupick, Franklin, and Jay Hoffman, Livingston, N.J., assignors to General Precision, Inc., Little Falls, N.J., a corporation of Delaware
Filed Dec. 6, 1960, Ser. No. 74,058
5 Claims. (Cl. 74—5.5)

This invention generally relates to improvements in gyroscopes and like instruments having relatively pivotable parts and is particularly concerned with improvements in the construction of the gyros to minimize the adverse effects of vibration.

In the application of gyros and like instruments of precision and accuracy in an environment subject to vibration, a serious problem arises in damping the vibrations to minimize their adverse effect upon the gyro. Where the vibrations may occur at a frequency near the natural mechanical resonance frequency of the gyroscope, the problem is particularly troublesome since the deflection and forces exerted on the sensitive gyro parts may be excessive and tend to injure or otherwise seriously interfere with the proper functioning and accuracy of the mechanism.

It is particularly directed to gyros for high speed aircraft, guided missiles and the like, in which the gyro is subjected to high velocity, high accelerations, rapid changes in attitude and position and vibrations encountered during this type of operation.

According to the present invention, it has been found that vibration damping of the gyro may be materially improved by employing a unique laminated construction for the gyro gimbal, which structure functions to frictionally damp the deflection of the gyro parts at resonance and considerably reduces the extent of such deflection at the natural resonant frequencies.

According to the invention, there is also provided a novel process for forming the improved gimbal structure and like the gimbal structure itself, the process may be applied in constructing instruments other than gyroscopes.

It is accordingly a principal object of the invention to provide a laminated gimbal structure for a gyroscope or like instrument to materially limit the amplitude or deflection of the parts during vibration and otherwise damp vibratory movements.

A further object is to provide such a gimbal structure that materially improves the response of the instrument when subjected to adverse vibrations.

A still further object is to provide a laminated pivotal supporting structure having improved vibration damping characteristics for gyroscopes and other sensitive instruments and devices.

A still further object is to provide a novel process for making such a laminated gimbal or a supporting structure.

Other objects and many additional advantages will be more readily understood by those skilled in the art after a detailed consideration of the following specification taken with the accompanying drawing, wherein.

FIGURES 6 to 9, inclusive, are sections through the laminated structure shown in FIGURES 2-5, which generally illustrate the various steps involved in forming a laminated gimbal structure according to the invention.

Figure 10:
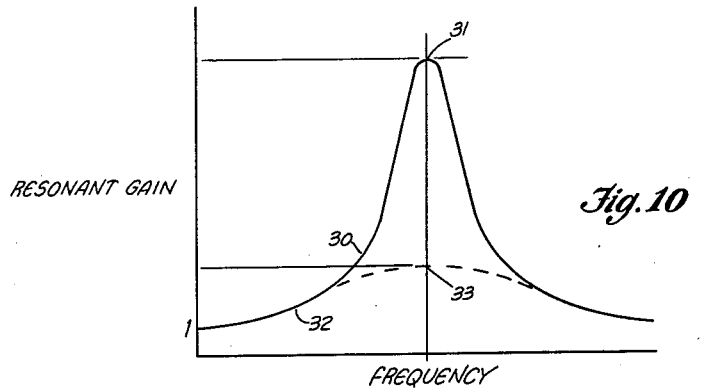

FIGURE 10 shows a comparison between a curve of resonant gain plotted against vibration frequency of a solid gimbal as contrasted with the curve of a laminated gimbal, constructed according to the drawings, FIGURES 1-5.

Figure 1:
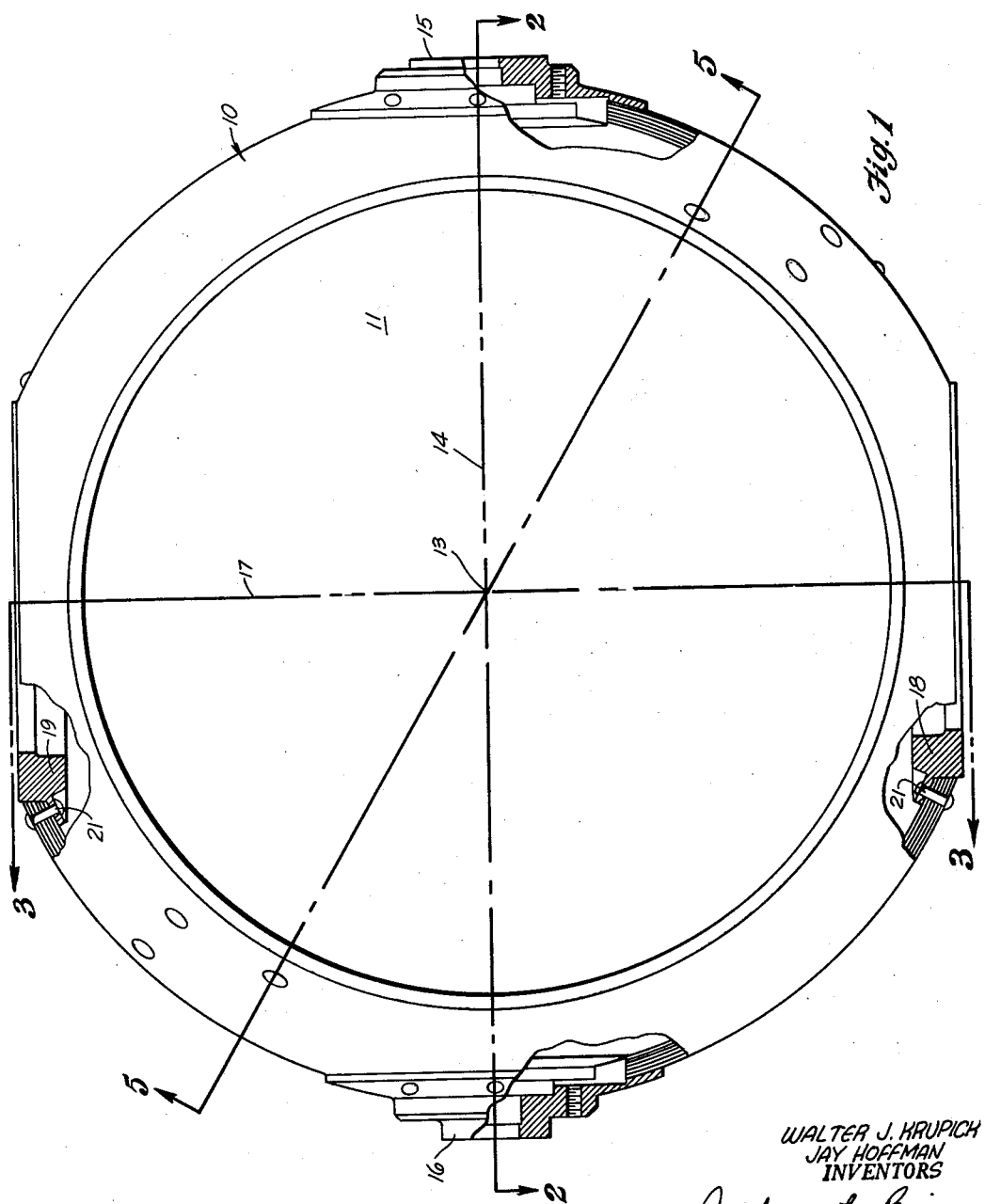
FIGURE 1 is a front elevational view illustrating one preferred gyro gimbal structure employing the invention, with portions of the structure being shown in section to illustrate the laminated configuration.
Figure 2:
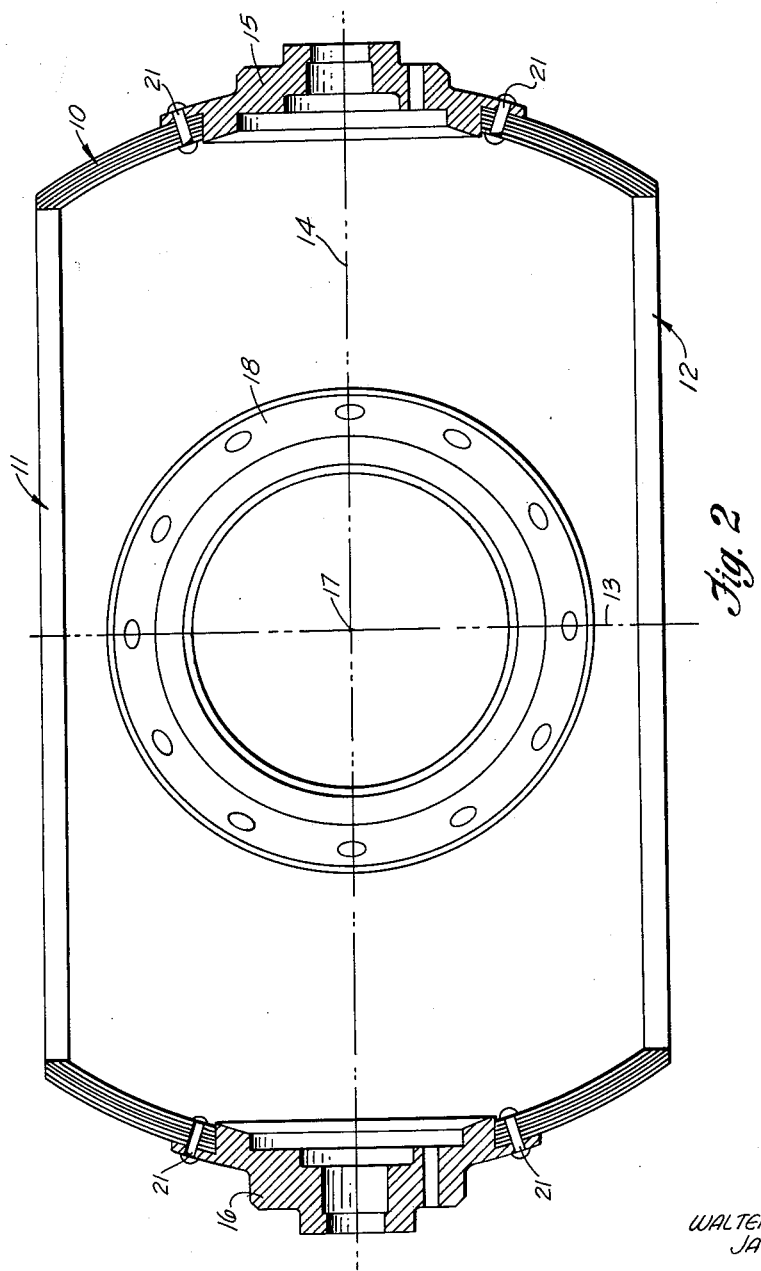
FIGURE 2 is a cross-sectional view taken along lines 2—2 of FIGURE 1.

Referring now to FIGURES 1 to 5 for a detailed consideration of one preferred gimbal structure according to the invention, the gimbal 10 is in the form and shape of a hollow substantially cylindrical member of arcuate cross-sectional wall contour, having large front and rear openings 11 and 12, which cylindrical member is adapted to rotatably support a gyro housing therein (not shown). As is well known in the gyroscope art, the gyro housing, in turn, serves to rotatably support a high speed rotor or other inertial member within the housing, which rotor is driven at high speed about its spin axis. Considering the view of FIGURE 1, a neutral position of the gyro rotor spin axis may be considered as being along the axis 13 that is transverse to the plane of the drawing. The gyro container, in turn, is adapted to be pivotally supported within the gimbal 10 about an axis, such as axis 14 (FIGURE 2) that is transverse to the gyro spin axis 13 whereby the gyro housing (not shown) may be rotatably displaced or pivoted about axis 14 transverse to the spin axis of the gyro. To support the gyro housing within the gimbal, the gimbal 10 is provided with a pair of oppositely disposed hubs 15 and 16 at opposite ends thereof and coaxial with the axis 14, which hubs are adapted to receive the bearings or other pivot structure associated with the gyro housing, none of which is shown in FIGURE 2 excepting for the hub members 15 and 16.

Figure 3:
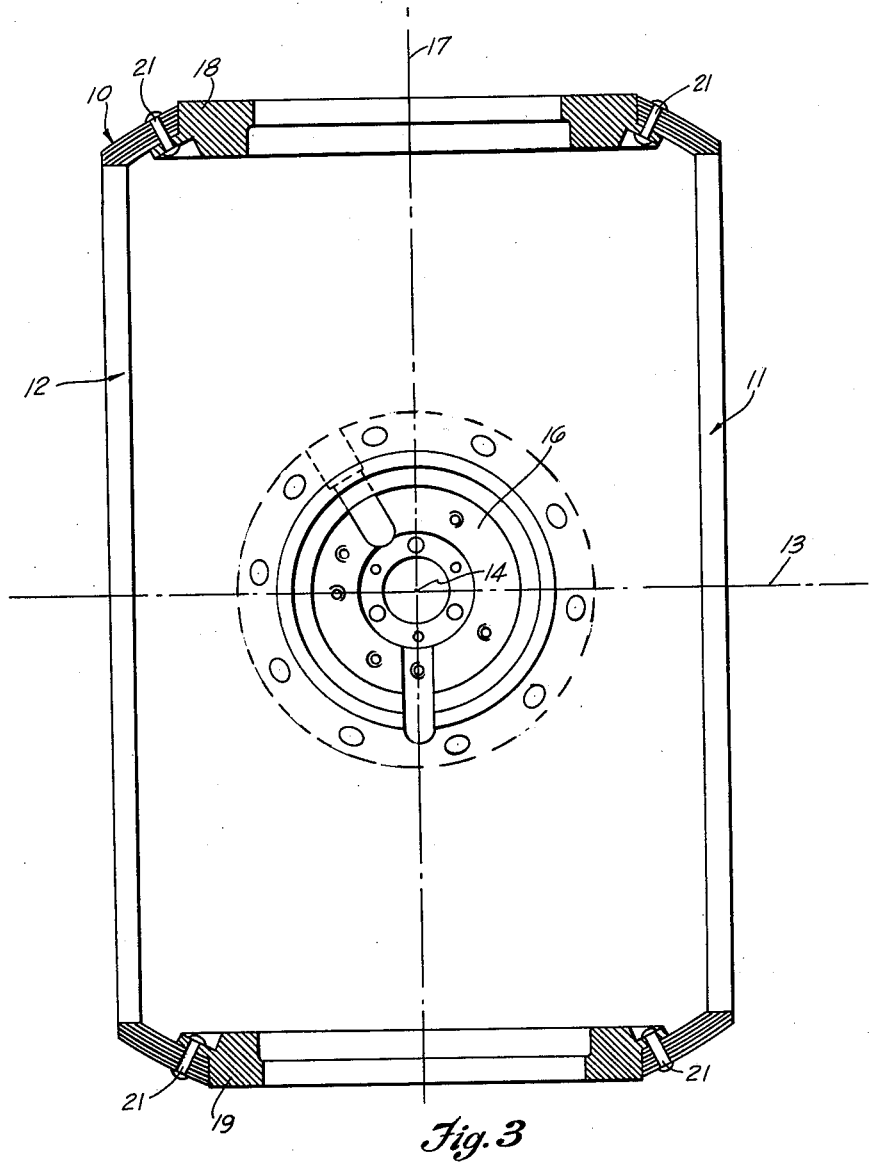
FIGURE 3 is a vertical sectional view taken along lines 3—3 of FIGURE 1.

The gimbal member 10, in turn, is rotatably supported about a third axis 17 that is transverse to both the gyro spin axis 13 and the gyro container pivot axis 14. As best shown in FIGURE 3, the gimbal member 10, is, therefore, provided with an additional pair of hubs 18 and 19 at opposite ends thereof and coaxial along axis 17 for receiving the shafts, bearings and other pivot structure (not shown).

Figure 4:
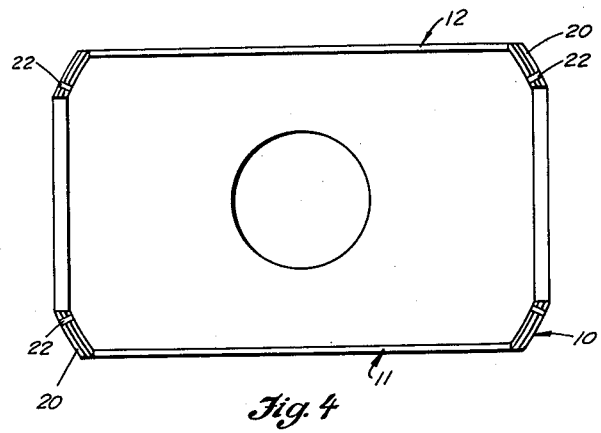
FIGURE 4 is a vertical sectional view similar to FIGURE 3 but illustrating the laminated structure of the gimbal blank prior to the addition of the hub members.
Figure 5:
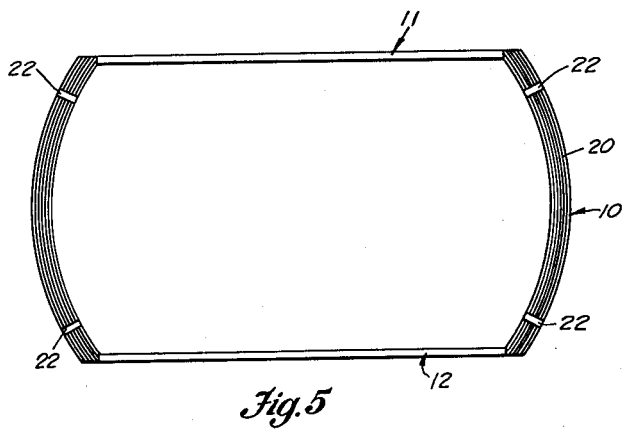
FIGURE 5 is a cross-sectional view taken along line 5—5 of FIGURE 1.

As best shown in FIGURE 4 illustrating a blank of the gimbal body 10 without the hub members, and by the sectional view of FIGURE 5, the body of the gimbal member is formed of a plurality of individual metal laminates, generally indicated at 20, that are adapted to be bound together by a series of spaced rivets 21 passing through aligned openings 22 in the laminates. The hub members 15, 16, 18 and 19 are also preferably riveted to the gimbal body in the same manner, as is shown in FIGURES 1, 2, and 3. These individual laminates 20 are fastened together in such manner as to permit relative sliding of the laminates one over the other when the gimbal member is flexed by the application of a vibrational force along its pivot axis 17 as may be caused by vibration of the body supporting the gimbal. Sliding of the individual layers over one another generates a frictional heat to absorb a considerable part of the external energy imparted to the gyro and hence the flexible gimbal structure serves to rapidly damp the externally generated vibrations, and reduces the amplitude of the vibrations being transmitted through the gimbal to the gyro container pivotally supported therein about axis 14.

In order to provide for maximum strength of the laminated structure shown in FIGURES 4 and 5, the macro-structure grain flow and direction of rolling of the various laminations is varied, that is the grain flow of one laminate, may be made substantially perpendicular to that of the adjoining lamination 20.

This tends to equalize the stresses in the gimbal structure, and tends to provide more uniform resistance to distortion due to vibration.

To perform in this manner, the laminated gimbal structure is made considerably more compliable than the other supporting srtucture whereby the external vibrational forces are transmitted to the gimbal which is thereupon caused to flex and permit the relative sliding movements of the individual laminations to dissipate the vibrational energy in the form of friction. Detailed studies and demonstrations of this structure have shown that this laminated structure provides an efficient friction damping means that considerably reduces the extent of displacement or amplitude of the vibrating parts at the resonant frequency of the gyro system over that provided by a solid gimbal structure having the same general dimensions. Stated in a more technical manner, the laminated gimbal structure serves to limit the resonance gain normally experienced in an instrument exposed to vibration. This is achieved by virtue of the increased damping peculiar to a laminated structure. The damping greatly decreases the structural gain and thereby redeuces the levels transmitted to the sensitive gyro container or other sensitive instrument supported by the gimbal.

To enhance the frictional dissipation of the energy, the individual laminates 20 forming the gimbal are preferably arranged with the metal grains in each laminate being disposed in a different direction than that of the other laminates. On the other hand, the laminated structure must be so constructed that the circumferential shear forces established by radially bending the gimbal in response to the vibration exceed the static friction forces between the individual laminates. If such shear forces do not exceed the static frictional forces, the laminates will not slip and be displaced with respect to one another and the gimbal functions in the manner of a solid body. Comparisons made between the laminated gimbal construction and a solid gimbal construction indicate that when both are exposed to the same heavy vibration environment, the laminated construction decreases the resonance gain from 6.5 to 3, or better than a 2 to 1 ratio over the solid gimbal. This comparison clearly demonstrates the fact that the laminated gimbal construction according to the invention is far superior to the solid gimbal construction in damping the vibrational movements and limiting the extent of deflection of the members in response to vibration at the critical resonance frequencies.

Considering in greater detail the functioning of the laminated gimbal construction in response to vibrational forces induced along axis 17, the vibration induced radial bending forces acting upon the gimbal along this axis cause the gimbal to flex and result in the individual laminates 20 slipping, one upon the other. The normal fastening and forming forces binding the laminates together generate a tangential frictional force to oppose such slippage. This force acting through the slipped distance dissipates the energy of the vibration to rapidly damp the effect of the vibrations upon the gyroscope container or other sensitive instrument.

In constructing the laminated gimbal structure, the factors that must be controlled are the moment of inertia, the laminate thickness, the gimbal radius, and the friction coefficient. In order to gain maximum benefits from such damping, it is also necessary to design the gimbal to be of an order of magnitude more compliant than its supporting structure. Since the total allowable deflection of the gimbal in response to the vibration is limited usually by a very small clearance that is characteristic of gyroscopes or other sensitive instruments, it is necessary to obtain maximum stiffness from all other structures. By doing so, the use of a damped gimbal having a reasonably high spring rate may be provided. Because of the fact that there may be an order of magnitude in the gimbal compliance over the other structure, the greatest portion of the elastic deformations in response to the vibrations takes place within the gimbal structure whereby the friction generating mechanism may efficiently absorb this energy.

For purposes of illustrating the relationship between the laminate thickness and the other factors mentioned above, it can be shown that the following relationship exists between the critical damping ratio that is desired and the various parameters of the gimbal structure.

$$\frac{C}{C_0} = \frac{C}{2mW_n} = \frac{6.05EIF}{tnp^2 Num(W_n)^2}$$

where:

C is the damping coefficient
$C_0$ is the critical damping coefficient
E is the modulus of elasticity
I is the moment of inertia
F is the excitation force
$u$ is the coefficient of friction
$m$ is the mass of the gimbal
$w_n$ is the excitation frequency
$n$ = number of laminates
$t$ = laminate thickness
$p$ = friction force
N = normal force FIGURES 6 to 9, inclusive, illustrate a preferred process of forming the laminated gimbal structure. In the first step shown in FIGURE 6 a plurality of flat plates of metal 20 are joined or laminated with the grains in each metal plate lying in the plane of the plate 20, and with the grains in the different laminations or plates being at an angle to one another to increase the frictional force therebetween.

Figures 7, 8:
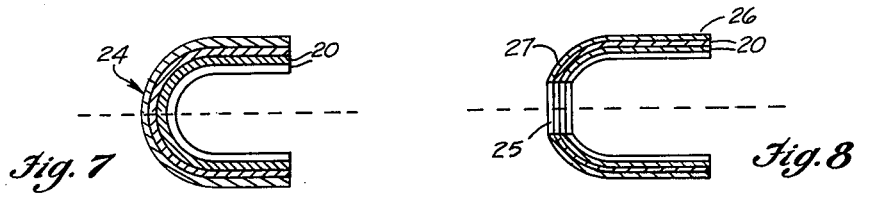

In the second step as shown in FIGURE 7, the flat laminated structure is formed into a hollow semi-spherical body, indicated as 24, by a hydroforming process or other suitable process. After the hollow body 24 of FIGURE 7 is formed, a symmetrical portion of the base is removed by machining or the like in the region indicated as 25 in FIGURE 8 to provide an approximately cylindrical body with one end portion 27 thereof being slightly spherical and the other end 26 thereof being cylindrical.

Figures 6, 9:
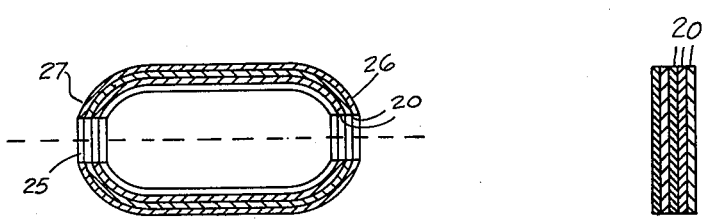

In one of the remaining steps illustrated in FIGURE 9, the gimbal body member of FIGURE 8 is then processed by a spinning technique or the like, to spin over the flat end 26 of the gimbal symmetrically with the semi-spherical end 27 and thereafter the gimbal is finished machined.

In the final steps (not shown) the laminates are riveted together and suitable openings are provided for the hub members 15, 16, 18, and 19 which thereafter are inserted and riveted to the gimbals as shown in FIGURES 1, 2, and 3.

FIGURE 10 shows a pair of curves representing a comparison between resonant gain plotted against frequency of the conventional solid gimbal as compared to the laminated gimbal, shown in FIGURES 1–5.

In the solid gimbal structure, the resonant gain curve 30, rises to a peak which is known as the resonant point 31.

In the second curve 32, representing the laminated type of gimbal structure, the central section of the curve is much lower than that of the curve 30, so that the peak of the curve is considerably lower than the resonant point 31.

In the curve 32 shown in FIGURE 10, the peak resonant gain is reduced by approximately 75 over that shown in the curve 30.

Although but one preferred gimbal structure has been illustrated and described together with one preferred process for forming the gimbal, many variations may be made in the article and process without departing from the spirit and scope of the invention. Accordingly, this invention should be considered as being limited only by the following claims appended hereto.

What is claimed is:

1. In a gyroscope having a high speed rotor rotatable about a spin axis, a friction damping system for pivotally suspending the rotor structure about a pivot axis transverse to the spin axis of the rotor, said system including a gimbal comprised of a plurality of laminations disposed substantially transverse to the pivot axis.

2. In the gyroscope of claim 1, each of said plurality of laminations being formed of an individual sheet of metal and the macro-structure grain flow in the individual laminations being disposed in different directions in the laminated gimbal.

3. In the gyro of claim 1, said gimbal being considerably more compliant than other portions of said system whereby vibrational forces being directed transverse to said gimbal pivot axis and to said spin axis produce elastic deformation of said gimbal resulting in slipping of the laminates over one another to absorb the vibration energy.

4. In a gyro having a rotor member rotatable about a spin axis, a gimbal means and pivot support means for pivotally supporting the rotor with respect to the gimbal about a pivot axis transverse to said spin axis, and second pivot support means for rotatably supporting said gimbal about an axis transverse to both said pivot axis and the spin axis, said gimbal being comprised of a plurality of laminations adapted to frictionally slip over one another upon the application of a force along the second axis sufficient to produce elastic deformation of the gimbal.

5. A friction damping mechanism for supporting a member rotatable about a first pivot axis, said mechanism being rotatable about a second axis with respect to a base support subject to vibrations, said friction damping mechanism comprising a plurality of metal laminations bound together in laminated form and with the grain direction in each lamination differing from that of the others, said laminations being disposed transverse to both said first and second pivot axes whereby flexure of said mechanism along said second axis of rotation responsively to vibrations results in frictional slipping of the laminates over one another, thereby to dissipate the vibration's energy and minimize its effect upon the body supported.

References Cited in the file of this patent

UNITED STATES PATENTS

| | | |
|---|---|---|
| 1,011,744 | Clamons | Dec. 12, 1911 |
| 1,685,402 | Grossweischede et al. | Sept. 25, 1928 |
| 2,843,926 | Turner | July 22, 1958 |
| 2,887,885 | Lackey et al. | May 26, 1959 |
| 2,899,828 | Lynn | Aug. 18, 1959 |

FOREIGN PATENTS

| | | |
|---|---|---|
| 81,920 | Norway | Dec. 14, 1953 |